Aug. 4, 1970     R. CHARPENTIER     3,522,923
MAGNETIC PANEL SUPPORTING AND SECURING DEVICES
Filed Nov. 14, 1966     2 Sheets-Sheet 1

INVENTOR
Roger Charpentier
Bacon & Thomas
ATTORNEYS

Aug. 4, 1970  R. CHARPENTIER  3,522,923
MAGNETIC PANEL SUPPORTING AND SECURING DEVICES
Filed Nov. 14, 1966  2 Sheets-Sheet 2
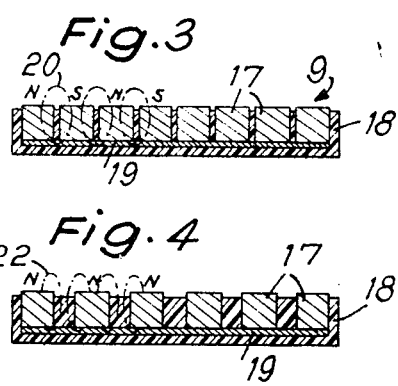
INVENTOR
Roger Charpentier
Bacon & Thomas
ATTORNEYS United States Patent Office 3,522,923
Patented Aug. 4, 1970

3,522,923
MAGNETIC PANEL SUPPORTING AND
SECURING DEVICES
Roger Charpentier, 27 bis Avenuedes Lilas,
64 Pau, France
Filed Nov. 14, 1966, Ser. No. 593,987
Claims priority, application France, Nov. 17, 1965,
38,752; Oct. 28, 1966, 81,989
Int. Cl. H01f 1/00
U.S. Cl. 248—206                                    4 Claims

ABSTRACT OF THE DISCLOSURE

The panel supporting device comprises a plate formed with integral prong means insertable in one end of a panel and inclined prong means or separate fasteners, insertable in the upper surface of the panel, for securely connecting the device to a panel. A magnet carried by the plate is employed for detachably connecting the device and attached panel with a suitable metallic support.

---

This invention relates to panel securing assemblies.

Numerous arrangements are known for securing on a carrier framework panel of a relatively light weight material which offers low resistance to penetration, for example an expanded synthetic-resin, as a porous body (an agglomerate of granules, natural or synthetic fibres, or others), as composite cellular bodies, etc. Such arrangements enable the construction particularly of suspended ceilings, partitions, various coverings.

Among known arrangements relating to fixing of panels to a framework is that described French Pat. 1,362,162 which arrangement comprises a plate having straight prongs or other securing means that are arranged to be driven perpendicularly into the edge of a panel. These plates are then normally fixed by means of screws onto a wooden framework.

British Pat. 707,817, illustrated an arrangement including a securing plate having oblique prongs which are arranged to be driven in a slanting manner into a hidden face of a panel. These plates are normally fixed onto the wooden framework by fitting curved tabs or flaps on the wooden framework.

Finally French Pat. 1,314,564 describes the utilization of permanent magnets for fixing rigid and compact panels on a framework.

The main disadvantage of these previously proposed methods lies in the fact that the total cost of an installation such as described is relatively high by reason of the substantial cost of the framework and of the high cost of erection since this takes a long period. If the cost is reduced it is generally to the detriment of the rigidity of the joints between the panels and the framework.

The present invention aims at remedying these difficulties by producing an arrangement for fixing panels of the type hereinbefore described.

In summary according to the present invention there is provided an assembly for supporting a panel of light-weight, low-penetration resistance material, plate means, prong means rigid with the plate means and engaged in said panel, support structure, and magnetic suspension means coupling the plate means to the support structure.

According to one preferred embodiment, the panel has a front portion and a side portion corresponding to and intended to co-operate respectively with the hidden face and the edge of a panel, the prong or prongs being rigid with the edge portion of the plate and extending in a direction parallel to the front portion.

In all cases the magnetic assembly is advantageously supported by that part of the plate, applied against the hidden face of a panel and situated adjacent the side of the same while the armature constitutes at least a part of the framework. In addition, the magnet assembly is preferably pivotally mounted on the panel.

Certain embodiments of arrangements, in accordance with the invention, will now be described, by way of example, with reference to the accompanying diagrammatic drawings, in which:

FIGS. 3 and 4 are longitudinal sections of magnetic elements such as can be used in the embodiments of FIGS. 1 and 2;

FIG. 5 is a graph showing the variation of attractive force F (on the ordinate axis) with the clearance e (on the absissa axis) for the magnetic attraction existing in the arrangements of FIGS. 1 and 2.

Figure 1:
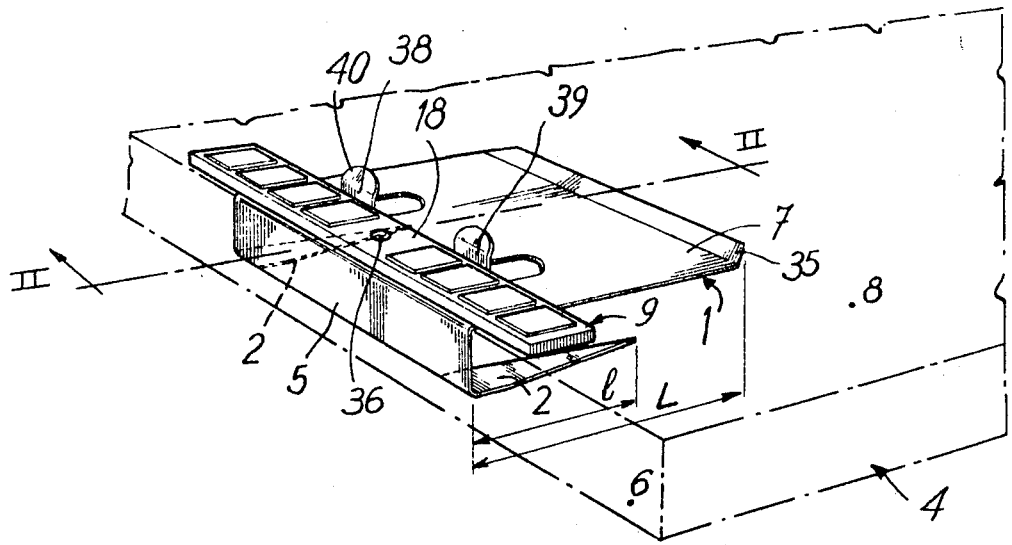
FIG. 1 is a perspective view of an embodiment of the invention showing an arrangement for fixing a plate to a framework with a panel to be supported shown in phantom lines.
Figure 2:
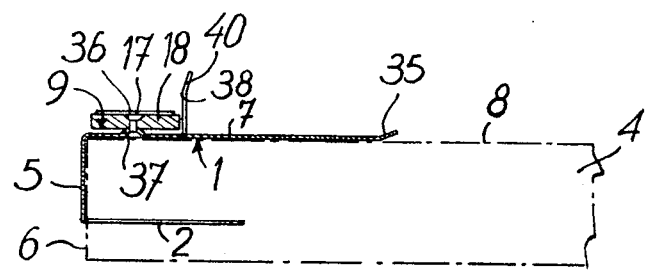
FIG. 2 is a vertical section taken along the line II—II of FIG. 1.

FIGS. 1 and 2 show one embodiment of the invention in which a plate 1 has projecting anchoring prongs or barbs 2 orientated so as to be able to penetrate into a panel 4 during positioning of the latter on the plate. This panel 4 may comprise a relatively light-weight material offering low resistance to penetration and it may be of or expanded material (foam) or of a porous body (agglomerations of granules, of fibres and of other materials) or of a cellular composite type of material, etc. The panel may advantageously be formed of a synthetic foam preferably a phenol, the exposed face of which may be covered with aluminium foil.

In the drawing, the plate 1 is angular having a side portion 5 corresponding to the edge 6 of the panel to which it is to be applied and is formed with one or a number of flat prongs 2 extending in a direction substantially parallel to the front or other portion 7 of the said plate. The front portion 7 is intended to be disposed opposite the non-exposed face 8 of the panel 4 is itself formed with one or a number of prongs 3 having the same form as the prongs 2, but extending at a downwardly inclined angle (FIGS. 1 and 2). The anchoring prongs 2 have to be pointed in order to penetrate into the panel 4 and also to include projecting members such as barbs to oppose the extraction of the prongs. In another embodiment (not shown) the prongs 2 are profiled as the tip of a lance and connected to the corresponding sides of the plate 1 by stems. In order to position the plate 1, it is sufficient to drive the prongs 2 into the material of the panel until the side 5 abuts the edge 6 of the panel and the side 7 abuts the non-exposed face 8 of the latter. As shown, the prongs 2 are planar or flat and are of sufficient width and length to ensure a total surface area large enough to prevent the relatively fragile material of the panel 4 from breaking or tearing laterally away from the prongs 2 which provide the sole means for holding the panel to the plate against normal forces. A very firm connection is thus provided between the plate 1 and the panel under consideration. It will be appreciated that at least two plates have to be mounted on each panel and in the case where the latter has a relatively small surface it is advantageous to mount four plates 1 at the corners.

The arrangement in accordance with the invention also comprises a magnetic attraction assembly 9 adapted to be magnetically attached to a steel member of a fixed carrier framework or support structure. The magnetic attraction assembly 9 is supported adjacent the side portion 5 by the portion 7 of the plate 1. If the carrier framework is of steel, it forms the armature for the magnetic attraction assembly. On the contrary, if it is of another material, non-magnetic (for example synthetic resin), the armature is formed by a steel plate connection on to this carrier framework.

As is shown in FIGS. 1 and 2, the plate 1 and the corresponding attraction assembly 9 may extend perpendicularly to the panel 4.

The magnetic attraction assembly 9 may be fixed rigidly on its support (the plate 1 with barbs or prongs) and, with this object, various techniques can be used: gluing, riveting, setting or others or even clipping.

Whatever the embodiment envisaged, the magnetic attraction assembly 9 may also be mounted pivotally on its support (the plate 1 with barbs or prongs). This is the preferred form of connection because it allows for the correction of errors in the dimensions of the carrier framework.

With regard to the magnetic attraction assembly 9, this may comprise a plurality of permanent magnets 17, preferably of ferrite, embedded in a non-magnetic material 18 and separated in order that the magnetic field should be intense, that is to say that the attractive force remains substantial when the air gap, between the exposed polar faces of these magnets and the armature varies appreciably.

To this end and as can be appreciated from FIG. 3, the permanent magnets 17 may be closely adjacent one another and the polarities of their polar faces are successively inverted North-South-North-South . . . the opposite polar faces being in contact with a pole piece 19 embedded in the non-magnetic coating 18. In this case, the lines of force of the magnetic field 20 pass from one magnet to the other and there is thus produced a force F indicated by the curve 21 of FIG. 5.

In order to produce an intense magnetic field, it is also possible, as will appear from FIG. 4, to arrange that the permanent magnets 17 should be spaced apart from one another by a greater distance than those mentioned above, but that the polarity of the exposed polar faces should be the same, North for example, the opposite polar faces abutting against a pole piece 19 embedded in the non-magnetic coating 18. Under these conditions, the lines of force of the magnetic field 22 are closed through the non-magnetic coating 18, which allows for the relatively substantial spacing between the magnets 17. There is thus produced an attraction force F illustrated by the curve 23 of FIG. 5.

The embodiment of the arrangement in accordance with the invention illustrated in FIGS. 1 and 2 enables the erection of the plate to be effected simply, more rapidly, exactly and surely. It also allows the connection to be made firmly.

Moreover, the length L of the front portion 7 is preferably larger than length *l* of the prongs 2. In these conditions, the front portion 7 has an overhanging part which it is easily possible to apply to the hidden face 8 of the panel 4 and which it is possible to cause to slide on the latter during the introduction of the prongs 2. In order to facilitate this sliding, the free edge 35 of the front portion 7 is bent up. In any convenient manner it is possible to provide owing to this overhanging part a perfect guiding during the mounting of the plate.

Finally, the magnetic attraction assembly 9 constituted by permanent magnets 17 embedded in a non-magnetic coating 18, is pivotally mounted by a rivet 36 passing through the central part of the said coating and a hollow boss 37 of the front portion 7, in which the end of the rivet is inserted. The assembly 9 is, moreover, maintained parallel with the side portion 5 by means of two tags 38 and 39 bent up from the front portion 7 and bent substantially normal thereto.

In the embodiment shown, the tags 38 and 39 are also intended to constitute centering members for the panel 4 relative to the carrier framework. For this reason, these tags are situated on the side of the assembly which is opposite to the side portion 5 and project below this to the polar face of the assembly 9. It is their projecting parts which serve for centering of the panel along the corresponding edge of the profiled member of the carrier. The free edge 40 of this projecting part of the tags 38 and 39 can thus be combined in order to facilitate centering. By the above mentioned arrangements rapid positioning of a complete ceiling or other such installation can be achieved, the main work requiring no particular competence or special tools. Experience has shown that positioning by this method can be reduced to ten minutes per square metre from the usual fifty minutes per square metre. The economy achieved by this method thus permits a reduction of the overall cost of an installation and, moreover, the arrangements hereinbefore described are no more expensive than previously proposed arrangements.

Another advantage of the arrangements described is that the panels remains removable and thus permit easy rapid and non-destructive removal for necessary maintenance or repair of installations concealed by the panels (e.g. water supplies, gas, electrical ducting etc.)

Moreover, the pivotal mounting of the magnetic elements enables correction for geometrical defects which exist in the wooden framework. The choice of magnets and their mounting for mutual attraction to obtain an adequate attractive force remains important if the clearance between magnetic members varies, so as to produce a very firm fixing of the panel and reducing any risk of falling when the framework is subjected to vibration.

I claim:

1. In an assembly for suspending a panel of lightweight, low-penetration resistance material having a hidden face and an edge; plate means, said plate means having a front portion and a side portion each having a face abutting respectively the said hidden face and the said edge of the panel; prong means integral with the said side portions of the plate means, penetrating into the said edge of the panel and extending substantially parallel to the said front portion of the panel, said prong means being planar and of sufficient width and length to ensure a surface area thereon large enough to provide the sole means for holding the panel assembled to the plate against normal lateral forces; support structure disposed adjacent said front portion and on the side thereof opposite said face; a magnetic attraction assembly carried by the said front portion of the plate means and disposed adjacent to the said side portion of the latter and to said support structure; said magnetic attraction assembly being pivotally connected to the front portion of the plate means and comprising a centering edge on the front portion, said edge co-operating, on the one hand, with said magnetic attraction assembly for maintaining the latter parallel with the side portion of the plate means and, on the other hand, with the support structure; and an armature for the said magnetic assembly connected to the said support structure.

2. An assembly according to claim 1, wherein the front portion of the plate means is longer than the prong means of the side portion, and the front portion at the side thereof remote from said side portion, terminates in an edge part that is inclined to the remainder of the front portion in a direction away from the panel.

3. An assembly according to claim 1 wherein the said magnetic attraction assembly comprises a plurality of permanent magnets embedded in a non-magnetic material and separated in order that the magnetic field should be intense.

4. An assembly according to claim 1, wherein the armature constitutes a part of the support structure.

References Cited
UNITED STATES PATENTS

| | | | |
|---|---|---|---|
| 1,931,713 | 10/1933 | Walper | 52—361 |
| 2,230,349 | 2/1941 | Eaton et al. | 52—361 X |
| 2,888,291 | 5/1959 | Scott et al. | 292—251.5 |
| 2,268,023 | 12/1941 | Dunn | 248—206 X |
| 3,229,844 | 1/1966 | Simon | 248—206 X |

FOREIGN PATENTS

| | | |
|---|---|---|
| 1,314,564 | 12/1962 | France. |
| 1,362,162 | 4/1964 | France. |
| 707,817 | 4/1954 | Great Britain. |

ROY D. FRAZIER, Primary Examiner

F. DOMOTOR, Assistant Examiner

U.S. Cl. X.R.

52—483, 511